United States Patent
Morrill et al.

[11] 3,843,168
[45] Oct. 22, 1974

[54] CLAMP CONNECTORS

[75] Inventors: Charles D. Morrill, Bellaire; David P. Herd, Houston, both of Tex.; Thomas W. Childers, Mandeville, La.

[73] Assignee: Esso Production Research Company, Houston, Tex.

[22] Filed: Aug. 16, 1973

[21] Appl. No.: 389,055

[52] U.S. Cl..................... 285/24, 285/411, 285/420
[51] Int. Cl............................................ F16l 35/00
[58] Field of Search ........... 285/420, 410, 411, 414, 285/367, 24, 27, DIG. 21

[56] References Cited
UNITED STATES PATENTS

| | | | |
|---|---|---|---|
| 1,011,727 | 12/1911 | Blair | 285/24 |
| 2,956,818 | 10/1960 | Dickerson et al. | 285/DIG. 21 |
| 3,231,297 | 1/1966 | Watts et al. | 285/411 X |
| 3,534,984 | 10/1970 | Shuey | 285/24 |
| 3,701,549 | 10/1972 | Koomey et al. | 285/24 |

FOREIGN PATENTS OR APPLICATIONS 538,523  1/1956  Italy ............................. 285/DIG. 21

*Primary Examiner*—Alfred R. Guest
*Attorney, Agent, or Firm*—John S. Schneider

[57] ABSTRACT

A screw-operated clamp connector for use subsea to attach components to submerged support structure in a submerged production system used for producing well fluids and for performing well maintenance operations. The clamp connector is manipulator operable and includes two clamp halves attached to one of two mating hubs. The clamp halves are pulled together or pushed apart by turning two screws. Each screw has left and right-hand threads which mate with nuts in each end of the clamp halves. With the clamp in the open position and attached to one of the hubs the connector is lowered over the mating hub. Guides orient the hubs for proper mating engagement. Turning the screws moves the clamp halves together. The clamp halves are floating and have a limited amount of movement to accommodate themselves to the contours of the hubs.

13 Claims, 6 Drawing Figures

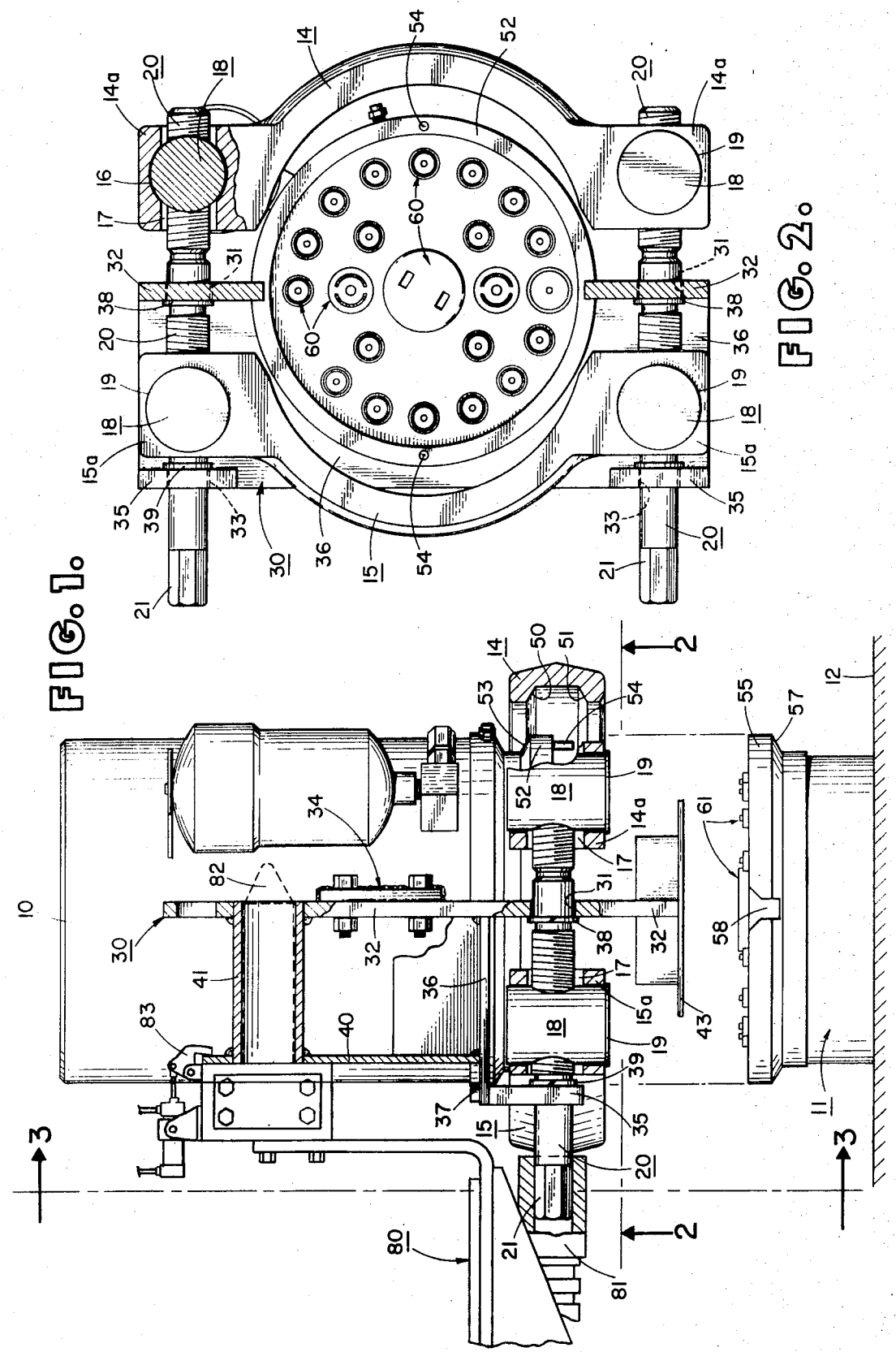

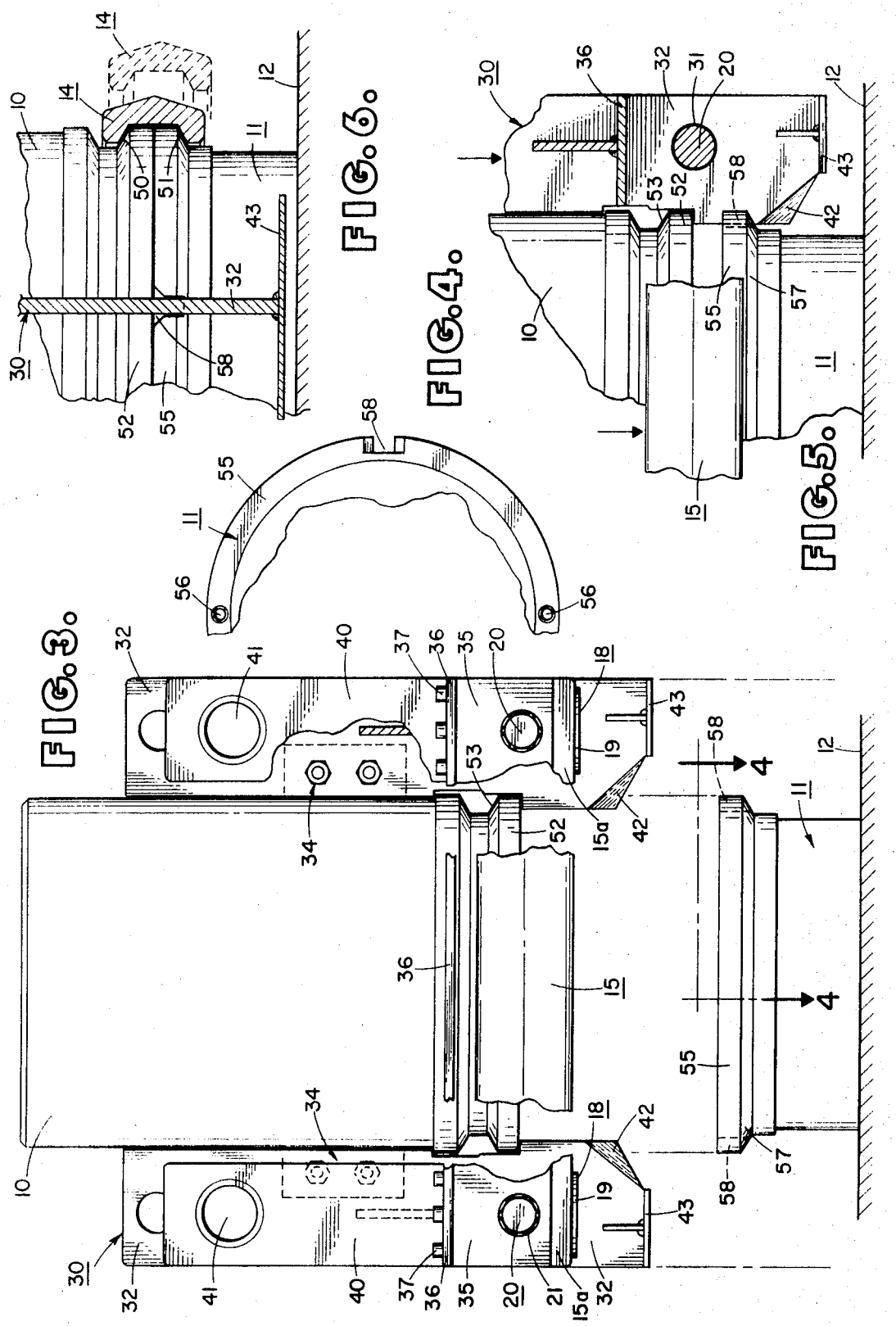

3,843,168

CLAMP CONNECTORS

BACKGROUND OF THE INVENTION

The present invention concerns screw-operated clamp connectors and, in particular, clamp connectors which are manipulator operable and designed to attach modular components to a submerged platform or support structure in a subsea oil and/or gas well production system.

BRIEF DESCRIPTION OF THE INVENTION

In accordance with the teachings of the invention a clamp connector to be used for clamping two hub members together comprises two clamp halves and two guide plates secured to one of the hub members. Each guide plate supports a screw and each screw has oppositely directed threads at each end thereof. Each end of the screw threads into a nut provided in each end of each clamp half. The clamp halves "float" on the nuts and have limited movement relative thereto.

BRIEF DESCRIPTION OF THE DRAWINGS

FIG. 1 is an elevation view of the clamp connector and the two hubs to be connected together;

FIG. 2 is a view taken along lines 2—2 of FIG. 1;

FIG. 3 is a view taken along lines 3—3 of FIG. 1;

FIG. 4 is a fragmentary view taken along the line 4—4 of FIG. 3.

FIG. 5 is a fragmentary view showing the function of the guide means of the connector; and FIG. 6 is an elevation view of the clamp connector and the two hub members in their clamped position.

DESCRIPTION OF THE PREFERRED EMBODIMENTS

Referring to FIGS. 1 to 6 the steps of clamping a replaceable hub or pod 10 to a fixed hub 11 secured to a submerged production platform or support structure, indicated at 12, are illustrated. The clamp consists of two identical semicircular halves 14 and 15 having formed on each of their ends ears or lugs 14a and 15a, respectively. A vertical bore 16 and a horizontal bore 17 transverse to bore 16 extend through each of the lugs. A cylindrical nut 18 is movably arranged in each bore 16. Each such nut is provided with an annular shoulder 19 on its lower end. Clamp halves 14 and 15 are moved toward or away from each other by rotation of two threaded rods or screws 20, each of which extends through the bores 17 of one set of lugs 14a, 15a and threadedly engages cylindrical nuts 18 therein. As shown, each screw 20 is of smaller diameter than the diameter of the horizontal bores 17 through which it extends, and has right-hand threads on one end and left-hand threads on the other end thereof. One end of each screw 20 is provided with socket effector connector surfaces 21.

Clamp halves 14 and 15 and nuts 18 and screws 20 associated therewith are mounted adjacent the lower end of pod 10 by a support frame, generally designated 30. Frame 30 includes two vertical guide and support plates 32 disposed on opposite sides of pod 10 and connected thereto by welded plates and bolts indicated at 34. Frame 30 also contains two support plates 35 disposed on opposite sides of pod 10 and secured to a horizontal plate 36 by bolts 37. Screws 20 are supported by plates 32 and 35 by extending each through a hole 31 in plate 32 and a hole 33 in plate 35. Longitudinal movements of screws 20 are prevented by split rings or washers 38 and 39 which are arranged on screws 20 and abut against plates 32 and 35, respectively. Plates 35 also act as stop means to limit the outward (unclamped direction) movement of clamp halves 14 and 15. Vertical plates 40 are mounted on and welded to horizontal plate 36 and positioned inwardly of plates 32.

Horizontal tubular members 41 are welded between and extend through plates 32 and 40 and, as will be described, support pod 10 in positioning it for connection to fixed hub 11. As seen in FIG. 3, tubular members 41 are spaced above and aligned with screws 20. Plates 32 extend below the lower end of pod 10 are provided on their inner edges with tapered guide surfaces 42. Foot plates 43, welded to the lower ends of plates 32, support pod 10 when it is not in use.

Each of the clamp members 14 and 15 are provided with internal upper and lower tapered locking surfaces 50 and 51, respectively, and pod 10 is provided on its lower end with a downwardly facing flange 52 provided with a tapered locking surface 53. Extending downwardly from the lower end of flange 52 and located near the outer edge thereof are two guide pins 54 disposed on opposite sides of the flange. Fixed hub 11 is provided with an upper flange 55 containing guide holes 56 (see FIG. 4) in its upper surface to receive guide pins 54 and having a tapered locking surface 57. Two guide slots 58 are disposed on opposite sides of the outer periphery of flange 55 for receiving the guide surface of guide plates 32. The upper sides of guide slots 58 are tapered outwardly to facilitate entry of the guide plate surfaces of guide plate 32.

As illustrated in FIGS. 1 and 2, pod 10 may contain one-half of a number of hydraulic and/or electrical connectors 60, each of which is to engage a corresponding connector half 61 in the fixed hub 11.

A manipulator generally, designated 80, is shown in FIG. 1. The manipulator includes two socket effectors 81 which engage surfaces 21 of screws 20. Spear prongs 82 extend into tubes 41 and power driven latches 83 releasably latch the manipulator to the upper end of vertical plate 40. The spear prongs act as means for lifting and manipulating the pod for placement.

In operation, pod 10 is maneuvered into position over fixed hub 11 as illustrated in FIGS. 1 and 3. Clamp members 14 and 15 are in their lowermost position in relation to screws 20 and flange 52, as they abut on shoulder 19 of nuts 18. In this position the tapered locking surface 50 of the clamp members is partially above the level of tapered locking surface 53 of flange 52. The manipulator lowers the pod 10 toward the flange 55 with guide plates 32 engaging guide slots 58, thus aligning the two flange members 52 and 55. More precise and final alignment is provided by guide pins 54 entering guide holes 56. Pod 10 is lowered until flanges 52 and 53 engage. Screws 20 are rotated by the effector sockets 81 and the clamp halves are moved toward each other until the tapered surfaces of the clamp halves engage with the tapered surfaces of the flanges. Continued rotation of screws 20 cause the two flanges 52 and 55 to be drawn tightly together. The clamp halves are floating on the nuts 18 and have a limited amount of vertical movement confined between the nut shoulder 19 and the wall forming bore 17 of the clamp members. A limited amount of angular movement is also afforded to the clamp halves by the mounting of the nuts 18 and the annulus provided around the screws 20 by the bores 17. Such movement may allow a variation of, for example, as much as four and one-half turns in revolution between the two screws during make-up of the clamp assembly without binding the threads and still allow the clamps to function to bring the pod and the hub flanges together.

Changes and modifications may be made in the illustrative embodiments shown and described herein without departing from the scope of the invention as defined in the appended claims.

Having fully described the apparatus, operation, objects and advantages of our invention, we claim:

1. A clamp connector for use in clamping two hub members together comprising:
    two clamp halves surrounding said hub members;
    two spaced apart plates secured to one of said hub members on opposite sides thereof for engaging guide means on said other hub member;
    a screw member having oppositely directed threads at each end thereof and supported by each of said plates and extending through bores formed in each clamp half;
    a threaded nut mounted in each bore of each clamp half, each threaded end of each screw member mating with the threads of one of said nuts;
    said bore in each clamp half being larger than said screw member extending therethrough to permit limited movement of said clamp halves relative to said nuts; and
    rotations of said screw members in one direction causing said clamp halves to move to engagement with said hub members and clamp them together and rotations of said screw members in an opposite direction from said one direction causing said clamp halves to move to disengagement from said hub members.

2. A clamp connector as recited in claim 1 in which said clamp halves are slidable along said nuts and are movable angularly relative to said nuts in a direction perpendicular to the direction in which said clamp halves are slidable.

3. A clamp connector as recited in claim 2 including tapered locking surfaces on each clamp half for engaging locking surfaces on said hub members.

4. A clamp connector as recited in claim 3 including connector surfaces formed on one end of each of said screw members adapted to be engaged by manipulator means for rotating said screw members.

5. Apparatus for use subsea in a submerged production system for producing well fluids comprising:
    a fixed hub member located subsea;
    a removable hub member attachable to said fixed hub member;
    two plates secured to said removable hub member, said plates being located on opposite sides of said removable hub member;
    two clamp halves having bores formed in each end thereof and surrounding the lower end of said removable hub member;
    a screw member supported by each of said plates and extending through said bores formed in each clamp half, each screw member having oppositely directed threads at each end thereof;
    rotations of said screw members in one direction causing said clamp halves to move inwardly to engage the lower end of said removable hub member and the upper end of said fixed hub member to clamp said hub members together and rotations of said screw members in an opposite direction causing said clamp halves to move outwardly to disengage from said hub members.
    said bore in each clamp half being larger than said screw extending therethrough to permit limited movement of said clamp halves relative to said nuts.

6. Apparatus as recited in claim 5 in which said limited movement comprises slidable movement of said clamp halves along the outer surface of said nuts and angular movement of said clamp halves about said nuts in a direction perpendicular to the direction of said slidable movement.

7. Apparatus as recited in claim 6 including: Rotations of said screw members in one direction causing said clamp halves to move inwardly to engage the lower end of said removable hub member and the upper end of said fixed hub member to clamp said hub members together and rotations of said screw members in an opposite direction causing said clamp halves to move outwardly to disengage from said hub members.

8. Apparatus as recited in claim 7 including tapered locking surfaces formed on said clamp halves; and tapered locking surfaces on said hub members engageable with said locking surfaces on said clamp halves for clamping said hub members together.

9. Apparatus as recited in claim 8 including guide means arranged on said fixed hub member for guiding said removable hub member onto said fixed hub member; and additional guide means on said hub members for ensuring proper positioning of said removable hub member on said fixed hub member.

10. Apparatus as recited in claim 9 in which said hub members contain a plurality of hydraulic and/or electrical connector halves which connect together when said hub members are engaged.

11. Apparatus as recited in claim 10 including connector surfaces formed on one end of each of said screw members;
    a manipulator for operating said connector surfaces to rotate screw members; said manipulator having latch means for supporting said removable hub member and for aiding in positioning said removable hub member properly on said fixed hub member.

12. Apparatus as recited in claim 11 including spaced apart tubular means;
    said manipulator containing means for engaging said tubular means for supporting said removable hub member by said manipulator.

13. Apparatus as recited in claim 12 in which said guide means on said fixed hub member comprises slots on the upper end of said fixed hub member, each engageable with one of said plates on said removable hub member; and said additional guide means comprises pins on said removable hub member and holes for receiving said pins on said fixed hub member.

* * * * *